US008953949B2

United States Patent
Liu et al.

(10) Patent No.: US 8,953,949 B2
(45) Date of Patent: Feb. 10, 2015

(54) METHOD AND APPARATUS FOR TRANSMITTING HIGH-LEVEL QAM OPTICAL SIGNALS WITH BINARY DRIVE SIGNALS

(75) Inventors: Xiang Liu, Murray Hill, NJ (US); Chandrasekhar Sethumadhavan, Murray Hill, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 100 days.

(21) Appl. No.: 13/340,916

(22) Filed: Dec. 30, 2011

(65) Prior Publication Data

US 2013/0170841 A1 Jul. 4, 2013

(51) Int. Cl.
*H04B 10/04* (2006.01)
*H04B 10/12* (2006.01)

(52) U.S. Cl.
USPC ........................................ 398/183; 398/182

(58) Field of Classification Search
CPC ............... H04B 10/50; H04B 10/5053; H04B 10/54–10/556
See application file for complete search history.

(56) References Cited

U.S. PATENT DOCUMENTS

| | | | |
|---|---|---|---|
| 7,558,487 B2 | 7/2009 | Liu et al. | |
| 2010/0329694 A1* | 12/2010 | Frankel | 398/159 |
| 2011/0069749 A1* | 3/2011 | Forrester et al. | 375/232 |
| 2011/0081151 A1* | 4/2011 | Yu et al. | 398/79 |
| 2013/0040689 A1* | 2/2013 | Iwai et al. | 455/522 |
| 2013/0107975 A1* | 5/2013 | Castelain | 375/260 |

OTHER PUBLICATIONS

D.C. Chu, "Polyphase Codes with Good Periodic Correlation Properties," published in IEEE Transactions on Information Theory, Jul. 1972, pp. 531-532.
T.M. Schmidl et al., "Robust Frequency and Timing Synchronization for OFDM," published in IEEE Transactions on Communications, vol. 45, No. 12, Dec. 1997, pp. 1613-1621.
C.J. Youn et al., "An Efficient and Frequency-Offset-Tolerant Channel Estimation and Synchronization Method for PDM CO-OFDM Transmission," published in the 2010 European Conference on Optical Communications (ECOC'10) as paper P4.06.

* cited by examiner

*Primary Examiner* — David Payne
*Assistant Examiner* — Casey Kretzer
(74) *Attorney, Agent, or Firm* — Davidson Sheehan LLP

(57) ABSTRACT

Methods and apparatus for power-efficiently and reliably transmitting high-level quadrature amplitude modulation (QAM) optical signals using binary drive signals. Even though binary signals are used to drive a QAM modulator directly, without digital-to-analog conversion, the methods and apparatus disclosed allow the transmission of pilot symbol sequences having near optimal properties, such as a constant power profile in the time domain; a mean power that is approximately the same as the mean power of the data symbols; and roughly uniform amplitude in the frequency domain for non-zero frequency components of the pilot symbol sequence. The binary drive signals can be processed so that the modulated optical signals are selectively constrained to a subset of points of the QAM constellation to form a QAM constellation with reduced size and a mean power that is approximately the same as the mean power of the original QAM constellation.

20 Claims, 5 Drawing Sheets

METHOD AND APPARATUS FOR TRANSMITTING HIGH-LEVEL QAM OPTICAL SIGNALS WITH BINARY DRIVE SIGNALS

FIELD OF INVENTION

The invention relates generally to the field of photonics and in particular to methods and apparatus for generating multi-level quadrature amplitude modulated optical signals.

BACKGROUND

In optical transmission, high-level quadrature amplitude modulation (QAM) is an attractive modulation format for achieving high spectral efficiency. To double spectral efficiency, polarization-division multiplexing (PDM) is often applied. There are several ways to transmit a PDM-QAM signal. One approach is to use two Cartesian or I/Q modulators, each driven by two multi-level drive signals, which can be generated by a pair of digital-to-analog converters (DACs). FIG. 1 shows a PDM-16QAM transmitter based on DACs. Each DAC generates a multi-level drive signal in accordance with two or more data signals provided thereto. This approach, however, has several drawbacks: (1) complex drive circuitry including multiple DACs are needed; (2) the I/Q modulators need to operate in a linear regime, so the modulation loss is high; and (3) the drive signals need to be amplified by linear RF amplifiers before driving the I/Q modulators, thereby increasing the requirements on the RF amplifiers and reducing the efficiency of the amplifiers.

Another approach to generate a PDM-QAM signal with n constellation points (PDM-n-QAM) is to use $\log_2(n)$ I/Q modulators, each driven by a binary drive signal. As an example, four I/Q modulators are needed to generate a PDM-16QAM signal. Examples of this approach can be found in U.S. Pat. No. 7,558,487, entitled "Multilevel amplitude and phase encoded signal generation", by Xiang Liu and Xing Wei, incorporated herein by reference in its entirety. With the use of binary drive signals, the aforementioned drawbacks of the DAC-based approach are avoided in this second approach. On the other hand, the use of DACs as in the first approach makes it possible to readily generate pilot symbols at different constellation points not limited to those of an n-QAM constellation. By thus using DACs, pilot symbol sequences with uniform amplitudes in both the time and frequency domains can be readily generated. Pilot symbol sequences with such properties are desirable for accurately probing the optical channel response, leading to good channel equalization.

SUMMARY

It has been unknown how to readily generate pilot symbol sequences with uniform amplitudes in both the time and frequency domains using $\log_2(n)$ I/Q modulators driven by binary drive signals. Illustrative embodiments set forth below provide methods and apparatus for transmitting quadrature-amplitude modulation (QAM) optical signals including data symbols and pilot symbol sequences, the modulated optical signals being generated using binary drive signals, wherein the pilot symbol sequences have (1) a constant power profile in the time domain; (2) a mean power that is approximately the same as the mean power of the data symbols; and (3) roughly uniform amplitude (or power) in the frequency domain for the non-zero frequency components of the pilot symbol sequence.

The use of such pilot symbol sequences enables accurate and reliable channel estimation, and minimizes fiber nonlinearity impairments, such as inter-channel cross-phase modulation (as the pilot symbols have a constant power that is approximately the same as the mean power of the data symbols).

In one or more embodiments, an apparatus for transmitting quadrature-amplitude modulation (QAM) optical signals including pilot symbols, includes a QAM modulator for generating modulated optical signals in accordance with binary drive signals, the modulated optical signals being characterized by a QAM constellation; and a drive signal generator including a pilot symbol sequence (PSS) generator, the drive signal generator for providing the binary drive signal inputs of the QAM modulator, and the PSS generator for generating a PSS characterized by a constant power profile in the time domain; a mean power that is approximately the same as a mean power of the QAM constellation; and a substantially uniform amplitude in the frequency domain.

In one or more embodiments, a method for transmitting quadrature-amplitude modulation (QAM) optical signals including pilot symbols, includes generating modulated optical signals including pilot symbols in accordance with binary drive signals, the modulated optical signals being characterized by a QAM constellation, wherein the pilot symbols are arranged in a pilot symbol sequence (PSS) characterized by a constant power profile in the time domain, a mean power that is approximately the same as a mean power of the QAM constellation; and a substantially uniform amplitude in the frequency domain.

The aforementioned and other aspects, features and benefits of embodiments of the present invention will be apparent from the figures and description which follow.

BRIEF DESCRIPTION OF FIGURES

Some embodiments of apparatus and/or methods in accordance with embodiments of the present invention are now described, by way of example only, and with reference to the accompanying figures in which.

DESCRIPTION OF EMBODIMENTS

In this description, it is assumed that the reader is familiar with the basic operating principles and architectures of optical signal modulation apparatus. The invention will be described herein in conjunction with illustrative embodiments of methods and apparatus for transmitting high-level quadrature amplitude modulation (QAM) optical signals including pilot symbols. It should be understood, however, that the invention is not limited to use with the particular systems and techniques described, but is instead more generally applicable to any QAM signal transmission and any pilot-assisted transmission.

Figure 2:
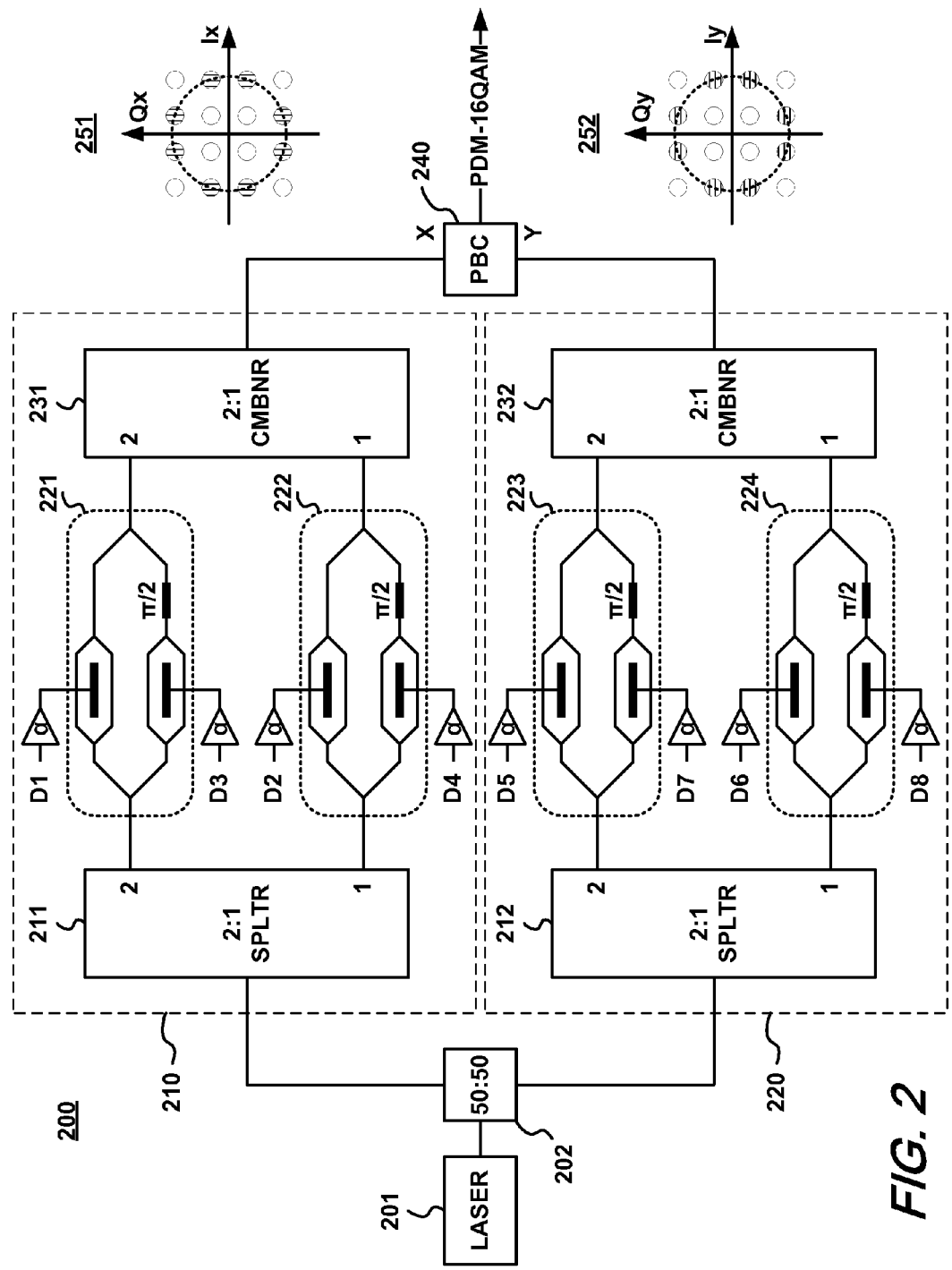
FIG. 2 is a schematic representation of an exemplary embodiment of apparatus for generating a PDM-16QAM optical signal using binary drive signals with pilot symbol sequences each having a constant power profile, a mean power which is also approximately the same as the mean power of the PDM-16QAM constellation, and roughly uniform amplitude (or power) in the frequency domain for non-zero frequency components.

FIG. 2 is a schematic representation of an exemplary embodiment of apparatus 200 using binary drive signals for generating PDM-16QAM optical signals with pilot symbol sequences having desirable properties. In particular, each pilot symbol sequence has a constant power that is approximately equal to the mean power of the PDM-16QAM signal and a roughly uniform amplitude in the frequency domain for its non-zero frequency components.

More particularly, a laser 201 is followed by a 50:50 power optical splitter 202 whose output arms are coupled to 16QAM modulators 210 and 220, and more specifically to 2:1 optical splitters 211 and 212 within modulators 210 and 220, respectively. Each of splitters 211 and 212 has two outputs, labeled 1 and 2, where the power of the signal on output 2 is twice that of the signal on output 1.

Figure 1:
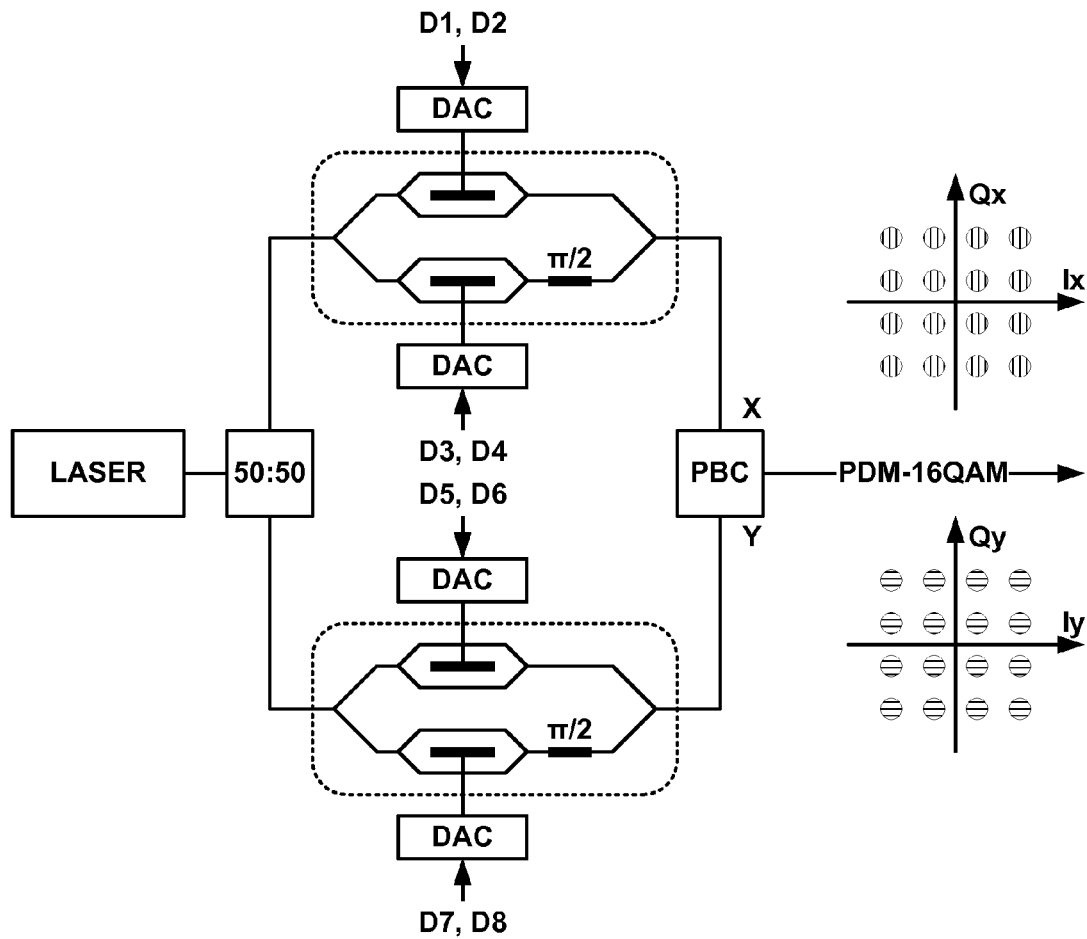
FIG. 1 is a schematic representation of a prior-art transmitter for PDM-16QAM based on digital-to-analog converters (DACs).

The outputs of splitters 211 and 212 are coupled to respective I/Q modulators 221-224. Each I/Q modulator 221-224 is driven by two binary drive signals, each of which represents one bit of an eight-bit (8-bit) data word that is ultimately modulated as one optical PDM-16QAM symbol by the apparatus 200. Advantageously, because the drive signals D1-D8 are binary, RF amplifiers (a) used to drive the I/Q modulators need not operate in a linear regime, as would be the case in the DAC-based implementation of FIG. 1. This allows the use of simpler and more power-efficient amplifiers, such as limiting amplifiers, in apparatus 200. Limiting amplifiers may also have greater bandwidths than linear amplifiers, thus enabling optical modulation at higher speeds.

The outputs of I/Q modulators are coupled to respective inputs of 2:1 optical combiners 231 and 232. Each of combiners 231 and 232 has two inputs, labeled 1 and 2, where the signal on input 2 contributes twice the power of the signal on input 1 to the combined output signal. Based on the 2:1 power ratios at splitter 211 and combiner 231, the power of the signal component modulated by I/Q modulator 221 at the output of combiner 231 is four times that of the signal component modulated by I/Q modulator 222. Likewise, the power of the signal component modulated by I/Q modulator 223 at the output of combiner 232 is four times that of the signal component modulated by I/Q modulator 224.

It should be noted that the optical splitter and combiner arrangement shown in FIG. 2 can be realized in a variety of suitable ways, including, for example, replacing splitters 202, 211 and 212 with a four-way splitter followed by variable optical attenuators (VOA) to achieve the desired power ratios. Similarly, each of combiners 231 and 232 can be implemented with a 1:1 combiner preceded by a VOA. As can be appreciated, VOAs can be placed before and/or after I/Q modulators 221-224.

The resultant 16QAM symbol constellations at the outputs of combiners 231 and 232 are shown in FIG. 2 as 251 and 252, respectively. As discussed in greater detail below, the shaded points in the constellations 251 and 252 can be used advantageously as pilot symbols, and generated in a proper order to form a pilot symbol sequence with desirable properties. It should be noted that all sixteen (16) of the constellation points can be used for data symbols.

The outputs of combiners 231 and 232 are coupled to inputs of polarization beam combiner (PBC) 240. PBC 240 combines the modulated 16QAM optical signal outputs of combiners 231 and 232 into one PDM-16QAM modulated optical signal.

Figure 3A:
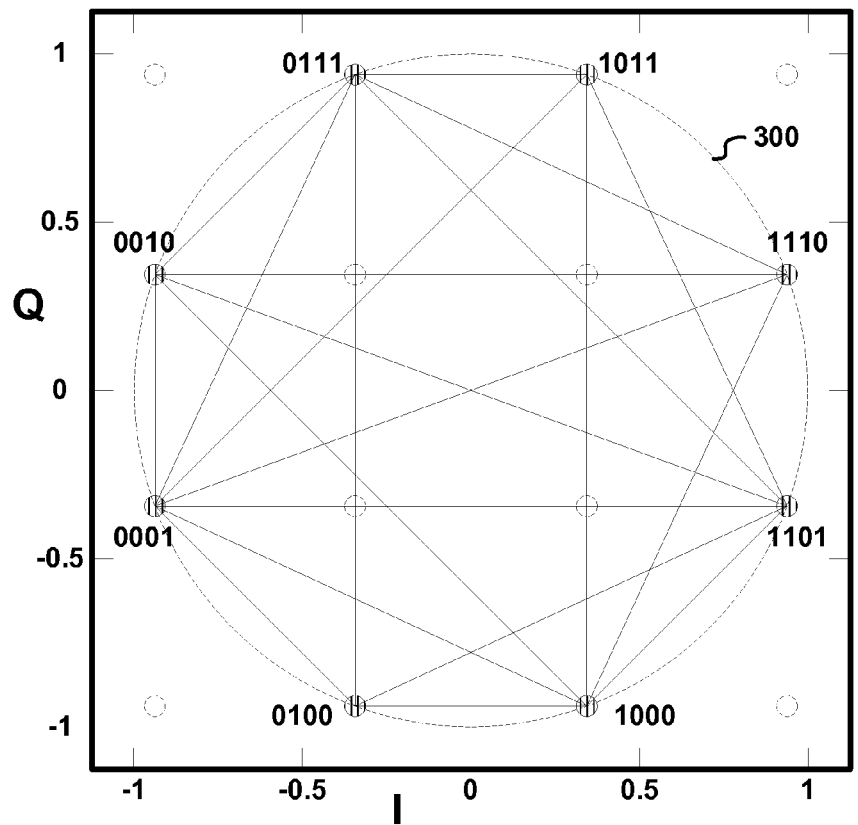
FIG. 3A is a graphical representation of the constellation points of an exemplary pilot symbol sequence with connecting lines partially illustrating the order by which these points are arranged.
Figure 3B:
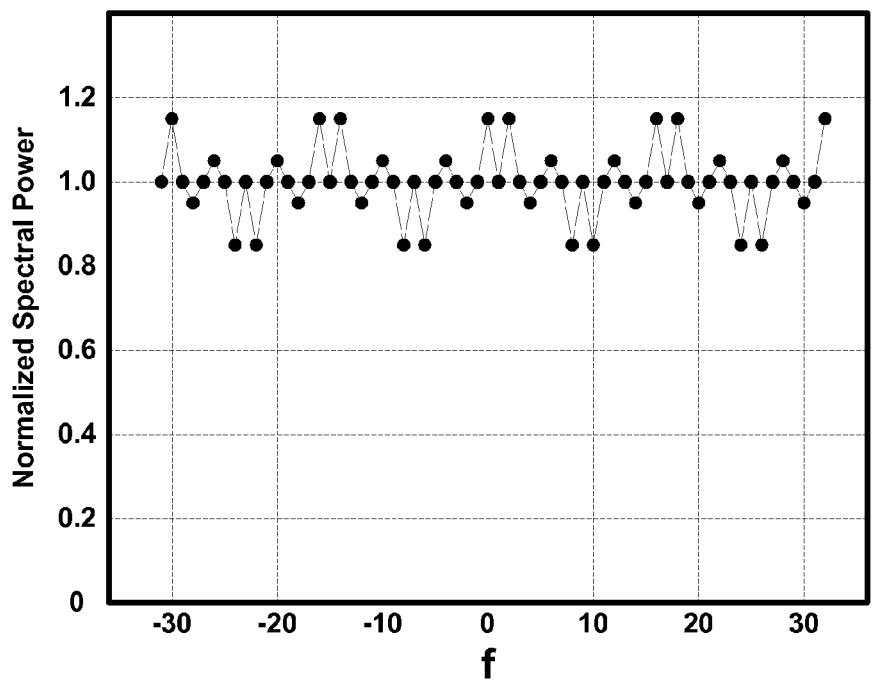
FIG. 3B is a graphical representation of the power profile of the exemplary pilot symbol sequence in the frequency domain.

Turning now to FIGS. 3A and 3B, FIG. 3A shows the constellation of an exemplary pilot symbol sequence. Each pilot symbol constellation point is shown shaded and is labeled with the corresponding values of binary drive signals D1D2D3D4. Constellation points not used for pilot symbols are shown in phantom. Connecting lines drawn between the pilot symbol constellation points indicate the order, at least partially, in which the pilot symbols are generated. An exemplary pilot symbol sequence consists of a contiguous block of sixty-four (64) pilot symbols transmitted in a particular order so as to have a roughly uniform power profile in the frequency domain. As can be seen in FIG. 3A, the pilot symbol sequence is of constant amplitude and power, each pilot symbol constellation point lying on dashed circle 300. It should be noted that circle 300 represents an amplitude (or power) that approximates the mean amplitude or power of all symbols in the 16QAM constellation. Pilot symbol sequences with lower power would have greater competition from noise (i.e., lower signal-to-noise ratio), whereas pilot symbol sequences with higher power could cause a nonlinear penalty to other symbols through fiber nonlinear effects such as cross-phase modulation. In exemplary embodiments, the mean power of the pilot symbol sequence is within ±25% or ±1 dB of the mean power of the data symbols.

FIG. 3B shows the amplitude profile in the frequency domain of the exemplary sixty-four (64) pilot symbol sequence. In the graph of FIG. 3B, normalized spectral power is plotted against the frequency index (f) of the frequency components of the pilot symbol sequence of FIG. 3A. As can be seen in FIG. 3B, the amplitude profile of the exemplary pilot symbol sequence is relatively uniform; i.e., in exemplary embodiments, the pilot symbol sequence has a power profile (the square of the absolute value of the amplitude profile) with a peak-to-peak variation of no more than about 2 dB.

Thus, as shown, the exemplary pilot symbol sequence enjoys three desirable properties: (1) a constant power profile in the time domain; (2) a mean power that is substantially the same as the mean power of the data symbols; and (3) roughly uniform amplitude (and power) in the frequency domain for non-zero frequency components. The use of pilot symbol sequences with such properties enables accurate and reliable channel estimation through, for example, pilot-assisted, single-carrier, frequency-division equalization (PA-SC-FDE). It should be noted that forming pilot symbol sequences with the aforementioned desirable properties entails not only the judicious selection of constellation points for use as pilot symbols, but also the order in which the pilot symbols are generated and transmitted.

Although an exemplary pilot symbol sequence of length sixty-four (64) is described with respect to FIGS. 3A and 3B, the length of a pilot symbol sequence should be greater than the channel memory length. For example, without dispersion compensation, the preferred length of a pilot symbol sequence may be greater than one-hundred-twenty-eight (128) symbols, whereas with dispersion compensation (optical or digital), the preferred length may be between sixteen (16) and one-hundred-twenty-eight (128) symbols.

An exemplary pilot symbol sequence of interest is formed in accordance with the so-called Chu sequence, expressed as follows:

$$E(n) = \exp[jR\pi(n-1)^2/N], \qquad (1)$$

where N is the length of the sequence, n=1, 2, ..., N, and M is an integer that is prime to N. For example, N=64 and M=3. In exemplary embodiments, pilot symbol sequences consistent with the Chu sequence can be obtained using a QAM modulator with binary drive signals. In one exemplary embodiment, a Chu sequence pilot symbol sequence is generated using a 16QAM modulator with binary drive signals, wherein the constellation points of the Chu sequence are mapped to a subset of the sixteen 16QAM constellation points, with each constellation point of the Chu sequence being mapped to the nearest 16QAM constellation point.

In an exemplary embodiment, each constellation point of the Chu sequence is first rotated by a predetermined phase (e.g., ~π/8 or ~0.4 radian) before determining the closest 16QAM constellation point. Such a mapping can be carried out in accordance with the following exemplary procedure:

(1) Perform phase rotation of Chu sequence constellation point E:

$$E2 = E^* \exp(-j^*\pi/8);$$

(2) Perform 16QAM demodulation of phase-rotated point E2 to determine binary values D1, D2, D3 and D4:

$$D1 = (\text{real}(E2) > 0);$$

$$D3 = (\text{imag}(E2) > 0);$$

$$D2 = (\text{real}(E2) > 2/\text{sqrt}(10)) | ((\text{real}(E2) > -2/\text{sqrt}(10)) \& (\text{real}(E2) < 0));$$

$$D4 = (\text{imag}(E2) > 2/\text{sqrt}(10)) | ((\text{imag}(E2) > -2/\text{sqrt}(10)) \& (\text{imag}(E2) < 0));$$

(3) Perform mapping to the corresponding point in the 16QAM constellation:

$$d = (D1 - 0.5)^*4 + (D2 - 0.5)^*2;$$

$$d = d + j^*((D3 - 0.5)^*4 + (D4 - 0.5)^*2);$$

$$E_{mapped} = d/\text{sqrt}(10);$$

In the above steps, real(x) denotes the real part of complex number x; imag(x) denotes the imaginary part of x; "&" denotes logic AND; "|" denotes logic OR; (a>b) outputs 1 if a>b and 0 if a≤b; and (a<b) outputs 1 if a≤b and 0 if a>b. In an exemplary embodiment, the above procedure is repeated for each constellation point of the Chu sequence generated in accordance with Eq. 1.

The above procedure can be readily adapted for use with different size QAM constellations. For example, for a 64QAM constellation, each constellation point of the Chu sequence is first rotated by a predetermined phase of approximately π/16, or ~0.2 radian before determining the closest 64QAM constellation point.

Other pilot symbol sequences that can be used in exemplary embodiments include those described in U.S. patent application Ser. No. 12/964,929, entitled PILOT-ASSISTED DATA TRANSMISSION IN A COHERENT OPTICAL-COMMUNICATION SYSTEM, incorporated herein by reference in its entirety.

Figure 4A:
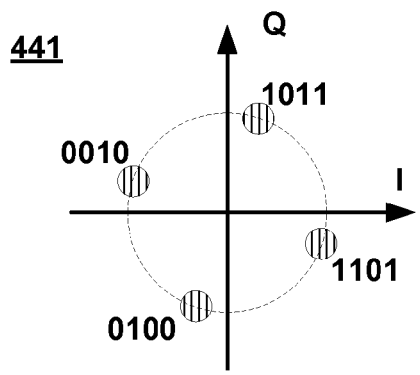
FIGS. 4A and 4B show exemplary 4QAM and 8QAM constellations, respectively, that can be generated with a 16QAM modulator using binary drive signals.
Figure 4A:
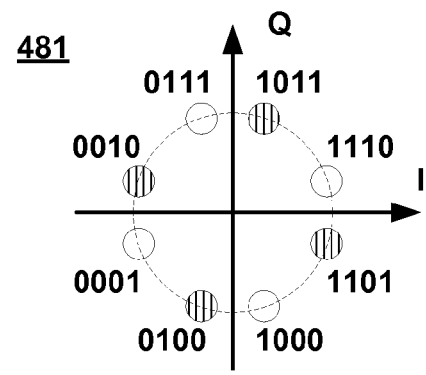
Figure 4A:
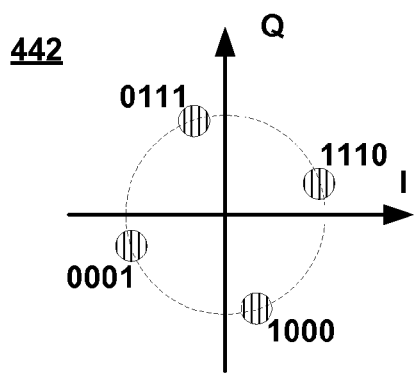
Figure 4A:
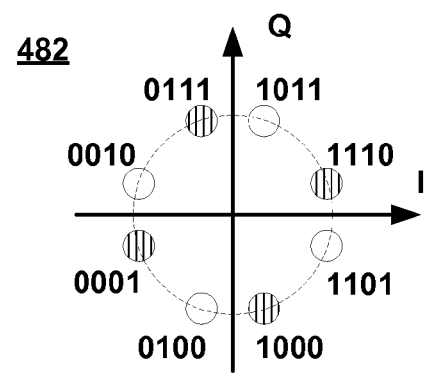
Figure 4B:
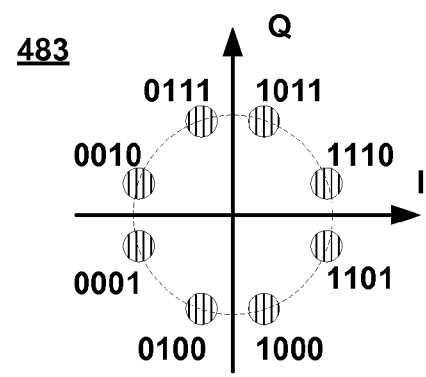

The apparatus 200 of FIG. 2 can also be used to generate lower-level PDM-QAM signals, including, for example, PDM-8QAM and PDM-4QAM optical signals. FIG. 4A shows two alternative 4QAM constellations 441 and 442, each including a subset of four of the points of the 16QAM constellation 251 (252). The four points in each of constellations 441 and 442 can be used for data as well as for pilot symbols. FIG. 4B shows three variants 481-483 of an 8QAM constellation which includes a subset of eight of the points of the 16QAM constellation 251 (252). The three variants of FIG. 4B differ in which constellation points are used for pilot symbols, the pilot symbol constellation points being shown shaded. Notably, the constellations shown in FIGS. 4A and 4B have the same average signal power as the 16QAM constellation of which they are subsets.

The apparatus of FIG. 2 can be readily extended to even higher-level QAM such as 64QAM, or any $2^{2n}$-QAM format, where n≥1.

Figure 5:
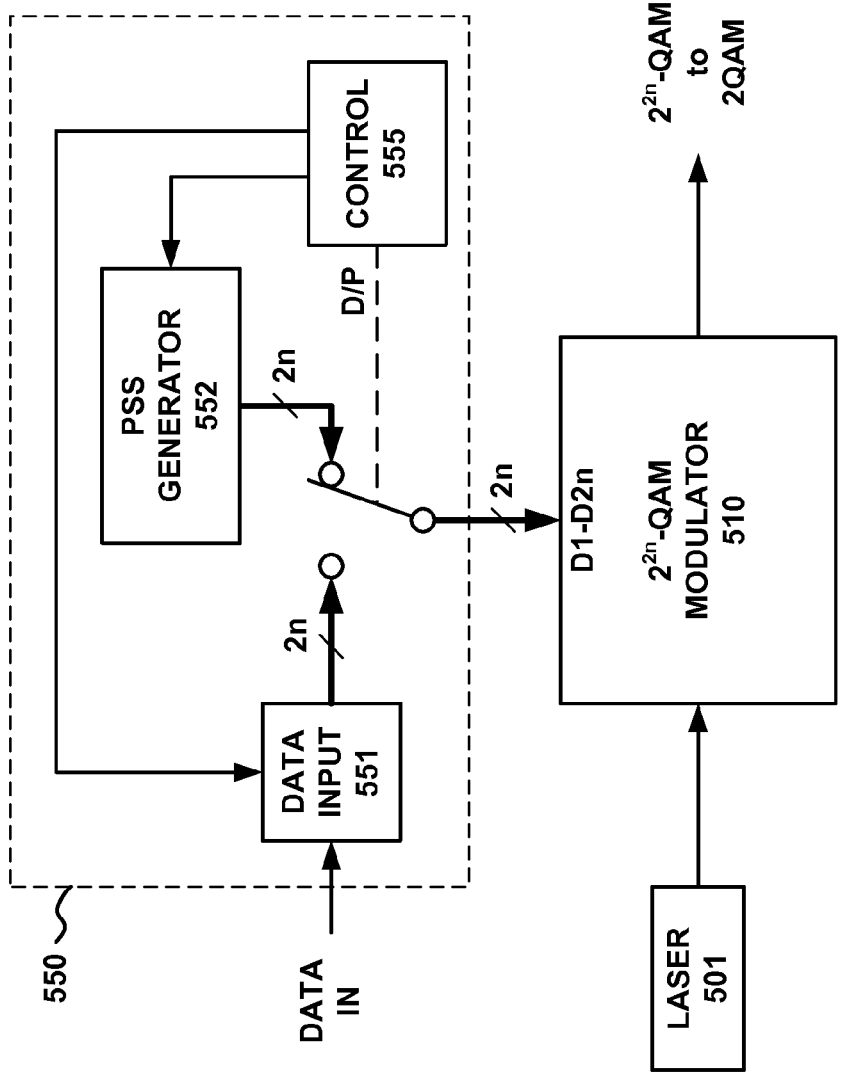
FIG. 5 is a schematic representation of an exemplary embodiment of apparatus for generating different level QAM signals with pilot symbol sequences.

FIG. 5 shows a block diagram of apparatus 500 for generating different level QAM signals from $2^{2n}$-QAM to 2QAM with pilot symbol sequences, as described above. Apparatus 500 includes a $2^{2n}$-QAM modulator 510 (e.g., such as 16QAM modulator 210 of FIG. 2, in the case of n=2) and a drive signal generator 550 which provides binary signals D1, D2, ..., D2n for driving modulator 510. Drive signal generator 550 includes a data input block 551, a pilot symbol sequence (PSS) generator 552 and a controller 555. Under the control of controller 555, binary signals D1-D2n are provided either from data input block 551 or PSS generator 552, depending on whether data or a PSS is to be modulated by modulator 510. Additionally, controller 555 can control whether $2^{2n}$-QAM signals (such as represented by constellation 251 or 252, in the case of n=2), or lower-level QAM signals (such as represented by the constellations of FIGS. 4A and 4B), are to be generated by controlling data input block 551. In an exemplary embodiment, data input block 551 translates the input data (DATA IN) into values for binary signals D1-D2n which can yield all $2^{2n}$ points of a $2^{2n}$-QAM constellation, or which are constrained to a subset of points of the $2^{2n}$-QAM constellation. Additionally, under the control of controller 555, PSS generator 552 will generate pilot symbol sequences consistent with the selected subset of constellation points. For example, in the case of n=2, in order to generate modulated optical signals in accordance with constellation 482 of FIG. 4B, controller 555 causes data input block 551 to map the input data into the 8-symbol subset of points shown and the PSS generator 552 to generate a pilot symbol sequence using the four shaded constellation points. For a given value of n, drive signal generator 550 can cause $2^{2n}$-QAM modulator 510 to generate QAM signals from $2^{2n}$-QAM to 2QAM. In the case of n=2, modulator 510 can generate any of the constellations 251 (252), 441, 442, or 481-483, as determined by controller 555.

The ability to switch between different level QAM formats without changing the optical hardware and drive circuitry allows for adapting the signal data rate based on transmission link conditions, thereby improving system performance and/or throughput. Moreover, maintaining the signal mean power unchanged or substantially unchanged when changing signal formats (such as those shown) helps avoid undesirable fiber nonlinear effects.

As can be appreciated, drive signal generator 550 and the functional blocks therein can be implemented in a variety of ways. For example, data input block 551 can be implemented with combinatorial logic and PSS generator 552 can be implemented using a look-up table stored in memory. For example, the look-up table can include a table of binary D1, D2, D3 and D4 values as generated in accordance with the above-described procedure for approximating the Chu sequence. Moreover, drive signal generator 550 may be implemented, for example, as an integrated microcontroller or a combination of discrete components.

As can be appreciated, apparatus 500 can be readily extended to a PDM-N-QAM arrangement, such as shown in FIG. 2.

In an exemplary embodiment, a transmitter provides 200-Gb/s PDM-16QAM with high power efficiency (or low transmitter loss) and reliable operation. Additionally, the transmitter is format-adaptive, as described above, without any optical hardware change, further improving system performance and reducing operation cost.

Compared to conventional approaches of generating $2^{2n}$-QAM with pilot symbols using DACs, embodiments of the methods and apparatus disclosed herein offer low transmitter loss, relaxed requirements on modulator driver amplifiers (due to the use of binary drive signals), relaxed requirements on modulator bandwidth (due to full-swing driving), and do not require DACs, thereby allowing operation at higher speeds.

It should be understood that the particular examples and the corresponding assumptions described above are not limitations of the invention. For example, in other embodiments, the assumptions made above need not apply. Also, the particular phases, parameters and other characteristics of the embodiments described above may be varied in alternative embodiments. The invention may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

What is claimed is:

1. An apparatus comprising:
   a quadrature amplitude modulation (QAM) modulator for generating modulated optical signals by directly driving a plurality of I/Q modulators with binary drive signals, the modulated optical signals being characterized by a QAM constellation having a mean power; and
   a drive signal generator including a pilot symbol sequence (PSS) generator, the drive signal generator for providing the binary drive signals to the I/Q modulators, the PSS generator for generating a PSS having pilot symbols characterized by:
      a constant power profile in the time domain;
      a mean power that is approximately the same as the mean power of the QAM constellation; and
      a substantially uniform amplitude in the frequency domain;
   wherein pilot symbols in the PSS are a subset of the QAM symbols.

2. The apparatus of claim 1, wherein each pilot symbol of the PSS corresponds to a point in the QAM constellation.

3. The apparatus of claim 1, wherein the PSS is generated in accordance with an approximation of a Chu sequence.

4. The apparatus of claim 3, wherein each pilot symbol of the PSS corresponds to a point in the QAM constellation nearest to a point of the Chu sequence.

5. The apparatus of claim 3, wherein each pilot symbol of the PSS corresponds to a point in the QAM constellation nearest to a rotated point of the Chu sequence.

6. The apparatus of claim 5, wherein the QAM constellation is a 16QAM constellation and the rotated point of the Chu sequence is rotated by approximately $\pi/8$ radians.

7. The apparatus of claim 5, wherein the QAM constellation is a 64QAM constellation and the rotated point of the Chu sequence is rotated by approximately $\pi/16$ radians.

8. The apparatus of claim 1, wherein the drive signal generator generates the binary drive signals so that the QAM modulator generates modulated optical signals that are selectively constrained to a subset of points of the QAM constellation.

9. The apparatus of claim 8, wherein the subset of points forms a smaller QAM constellation with a mean power that is approximately the same as the mean power of the QAM constellation.

10. The apparatus of claim 1 comprising:
    a further QAM modulator for generating further modulated optical signals in accordance with further binary drive signals provided by the drive signal generator; and
    a polarization beam combiner (PBC) for combining the modulated optical signals and the further modulated optical signals into polarization-division-multiplexing-QAM modulated optical signals.

11. A method comprising:
    generating modulated optical signals including pilot symbols by directly driving a quadrature amplitude modulation (QAM) modulator with binary drive signals, the modulated optical signals being characterized by a QAM constellation having a mean power,
    wherein the pilot symbols are a subset of the QAM symbols and are arranged in a pilot symbol sequence (PSS), said pilot symbols characterized by:
       a constant power profile in the time domain;
       a mean power that is approximately the same as the mean power of the QAM constellation; and
       a substantially uniform amplitude in the frequency domain.

12. The method of claim 11, wherein each pilot symbol of the PSS corresponds to a point in the QAM constellation.

13. The method of claim 11, wherein the PSS is generated in accordance with an approximation of a Chu sequence.

14. The method of claim 13, wherein each pilot symbol of the PSS corresponds to a point in the QAM constellation nearest to a point of the Chu sequence.

15. The method of claim 13, wherein each pilot symbol of the PSS corresponds to a point in the QAM constellation nearest to a rotated point of the Chu sequence.

16. The method of claim 15, wherein the QAM constellation is a 16QAM constellation and the rotated point of the Chu sequence is rotated by approximately $\pi/8$ radians.

17. The method of claim 15, wherein the QAM constellation is a 64QAM constellation and the rotated point of the Chu sequence is rotated by approximately $\pi/16$ radians.

18. The method of claim 11, wherein the binary drive signals are processed so that the modulated optical signals are selectively constrained to a subset of points of the QAM constellation.

19. The method of claim 18, wherein the subset of points forms a smaller QAM constellation with a mean power that is approximately the same as the mean power of the QAM constellation.

20. The method of claim 11 comprising:
    generating further modulated optical signals in accordance with further binary drive signals; and
    combining the modulated optical signals and the further modulated optical signals into polarization-division-multiplexing-QAM modulated optical signals.

* * * * *